United States Patent
Inedia et al.

(10) Patent No.: US 9,352,694 B2
(45) Date of Patent: May 31, 2016

(54) FOLDING SEAT ASSEMBLY FOR A MOTOR VEHICLE

(71) Applicant: Ford Global Technologies, LLC, Dearborn, MI (US)

(72) Inventors: Gabriel Osehioria Inedia, Dagenham (GB); Ed Stubbs, London (GB); Stephen David Fleming, Hockley (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/252,919

(22) Filed: Apr. 15, 2014

(65) Prior Publication Data

US 2014/0319888 A1    Oct. 30, 2014

(30) Foreign Application Priority Data

Apr. 29, 2013 (GB) .................... 1307644.3

(51) Int. Cl.
  *B60R 5/04* (2006.01)
  *B60R 11/00* (2006.01)

(52) U.S. Cl.
  CPC ......... *B60R 5/045* (2013.01); *B60R 2011/0015* (2013.01)

(58) Field of Classification Search
  CPC .......................... B60R 5/047; B60N 2205/35
  See application file for complete search history.

(56) References Cited

U.S. PATENT DOCUMENTS

| | | | |
|---|---|---|---|
| 3,891,263 A | 6/1975 | Orsulak | |
| 4,277,097 A * | 7/1981 | Lalanne | 296/37.16 |
| 5,011,208 A * | 4/1991 | Lewallen | 296/37.16 |
| 5,547,187 A * | 8/1996 | Spykerman | 296/37.16 |
| 5,582,453 A | 12/1996 | Leuchtmann et al. | |
| 5,876,064 A * | 3/1999 | Ament | B60R 21/06 280/749 |
| 6,155,621 A * | 12/2000 | Nishida et al. | 296/24.4 |
| 6,220,754 B1 | 4/2001 | Stiglic et al. | |
| 6,702,355 B1 * | 3/2004 | Price et al. | 296/37.16 |
| 7,621,577 B2 * | 11/2009 | Schlecht | 296/24.4 |
| 2003/0122397 A1 * | 7/2003 | Maibom | B60N 2/20 296/69 |
| 2005/0225143 A1 * | 10/2005 | Sun et al. | 297/378.1 |
| 2007/0013201 A1 * | 1/2007 | Wagner | B60N 2/3011 296/24.43 |
| 2008/0036234 A1 | 2/2008 | Yokoyama et al. | |
| 2009/0288787 A1 * | 11/2009 | Yoshida | 160/351 |
| 2011/0266828 A1 | 11/2011 | Kikuchi et al. | |
| 2014/0015270 A1 * | 1/2014 | Staib | 296/24.43 |

FOREIGN PATENT DOCUMENTS

| | | |
|---|---|---|
| DE | 4328886 A1 | 3/1995 |
| DE | 20315395 U1 | 3/2004 |

(Continued)

OTHER PUBLICATIONS

Machine translation of FR 2714342, date pulled Apr. 6, 2015, p. 1-5.*

*Primary Examiner* — Elizabeth A Quast
(74) *Attorney, Agent, or Firm* — Vichit Chea; Price Heneveld LLP (57) ABSTRACT

A folding seat assembly includes a pair of seats each of which has a backrest and a seat cushion. A luggage compartment cover housing is attached to each backrest so as to cover substantially the entire rear face of each backrest for stowing an individual flexible luggage compartment cover for each seat. This enables each backrest to be folded into a stowed position without the need to remove the respective flexible luggage compartment cover or the respective luggage compartment cover housing and produces a substantially flat obstruction free load surface when so folded.

14 Claims, 4 Drawing Sheets

(56) References Cited

FOREIGN PATENT DOCUMENTS

| DE | 102005034767 A1 | 2/2007 |
|---|---|---|
| DE | 102009037391 B3 | 1/2011 |
| DE | 102010024506 A1 | 1/2012 |
| EP | 0565430 A1 | 10/1993 |
| FR | 2714342 A1 | 6/1995 |
| GB | 2431906 A | 9/2007 |
| JP | 01275231 A | 2/1989 |
| JP | 3703303 B2 | 10/2005 |

\* cited by examiner

FOLDING SEAT ASSEMBLY FOR A MOTOR VEHICLE

FIELD OF THE INVENTION

The present invention generally relates to a motor vehicle and, in particular, to a motor vehicle having a folding seat assembly including a luggage compartment cover.

BACKGROUND OF THE INVENTION

It is well known from, for example, U.S. Pat. No. 5,582,453; U.S. Patent Application Publication No. 2005/0225143 and Japanese Patent Publication 1275231 to provide a motor vehicle with a split rear folding seat. The split rear folding seat generally includes two seat cushions and two backrests. Each of the backrests is hingedly connected to its respective seat cushion and the backrests are foldable from a substantially upright position, in which they form a front wall of a luggage compartment of the motor vehicle, to a stowed position. When the backrests are in the substantially upright position the two seats forming the split rear folding seat provide seating for two or three passengers and, when the backrests are in the stowed position, increased luggage capacity is provided, but no seating is available.

It is also known from, for example, German Patent Publication 102010024506 to provide a rigid luggage compartment cover that extends across substantially the entire width of the luggage compartment. It is generally a problem with such an arrangement that, if the split rear folding seat is arranged with the backrests in the stowed position, then, in order to maximize stowage capacity or provide access to the enlarged luggage compartment, it is necessary to remove the rigid luggage compartment cover. This operation is often difficult to achieve and leaves the user with the problem of where to store the removed rigid luggage compartment cover.

It is further known from, for example, German Patent Publication 102009037391 to provide a flexible luggage compartment cover that extends across substantially the entire width of the luggage compartment. The flexible luggage compartment cover includes a roller upon which a flexible material is rolled to stow the luggage cover. It is a problem with such an arrangement that if the split rear folding seat is arranged with the backrests in the stowed position then in order to provide access to the enlarged luggage compartment it is often necessary to remove the stowed flexible luggage compartment cover. This operation is often difficult to achieve and leaves the user with the problem of where to store the removed flexible luggage compartment cover.

In an attempt to solve this problem it is known from FR 2714342 A to provide a split folding seat with two flexible luggage compartment covers, one for each seat. It is a problem with the arrangement shown in FR 2714342 A that when a backrest of the split folding seat is folded down a discontinuous load surface is produced due to the presence of the housing for the flexible luggage compartment cover.

It is therefore desirable to provide a luggage compartment cover arrangement that overcomes the problems associated with the conventional assemblies.

SUMMARY OF THE INVENTION

According to a first aspect of the invention there is provided a split folding seat assembly for mounting in a motor vehicle. The seat assembly includes a pair of independently foldable backrests, each backrest having a rear face to which a respective luggage compartment cover housing is attached for stowing a flexible luggage compartment cover. Each luggage compartment cover housing extends over substantially the entire rear face of the respective backrest to which it is attached. This has the advantage that a substantially flat load carrying surface is produced when the backrest is folded forward.

According to further aspects of the invention, each flexible luggage compartment cover may comprise a sheet of flexible material and a roller upon which the sheet of flexible material is rolled when the flexible luggage compartment cover is stowed and from which the sheet of flexible material is unrolled when the luggage compartment cover is in use.

Each sheet of flexible material may be adapted along one edge for locking engagement with a complementary adjacent edge of the other sheet of flexible material when the luggage compartment covers are both in use. This has the advantage that gapping between the two flexible sheets is prevented. A further advantage is that the edges of the two flexible sheets are stiffened by their locking engagement.

Each roller may be rotatably supported by a pair of spaced apart supports fastened to the backrest. The pair of spaced apart supports may be fastened to the backrest via the luggage compartment cover housing. This has the advantage that each roller can be pre-assembled onto its respective luggage compartment housing and then the housing along with the roller can be secured as an assembly to the respective backrest thereby simplifying assembly of the seat.

The pair of spaced apart supports may be formed as an integral part of the respective luggage compartment cover housing. This has the advantage that the supports are provided in a cost effective manner.

According to a second aspect of the invention there is provided a motor vehicle having a folding seat assembly constructed in accordance with said first aspect of the invention. The motor vehicle may have a rear floor and each luggage cover housing may form a substantially continuous flat surface with the rear floor when the respective backrest is folded forward. This has the advantage of improved luggage carrying performance due to lack of obstructions to loading.

These and other aspects, objects, and features of the present invention will be understood and appreciated by those skilled in the art upon studying the following specification, claims, and appended drawings.

DETAILED DESCRIPTION OF THE PREFERRED EMBODIMENTS

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
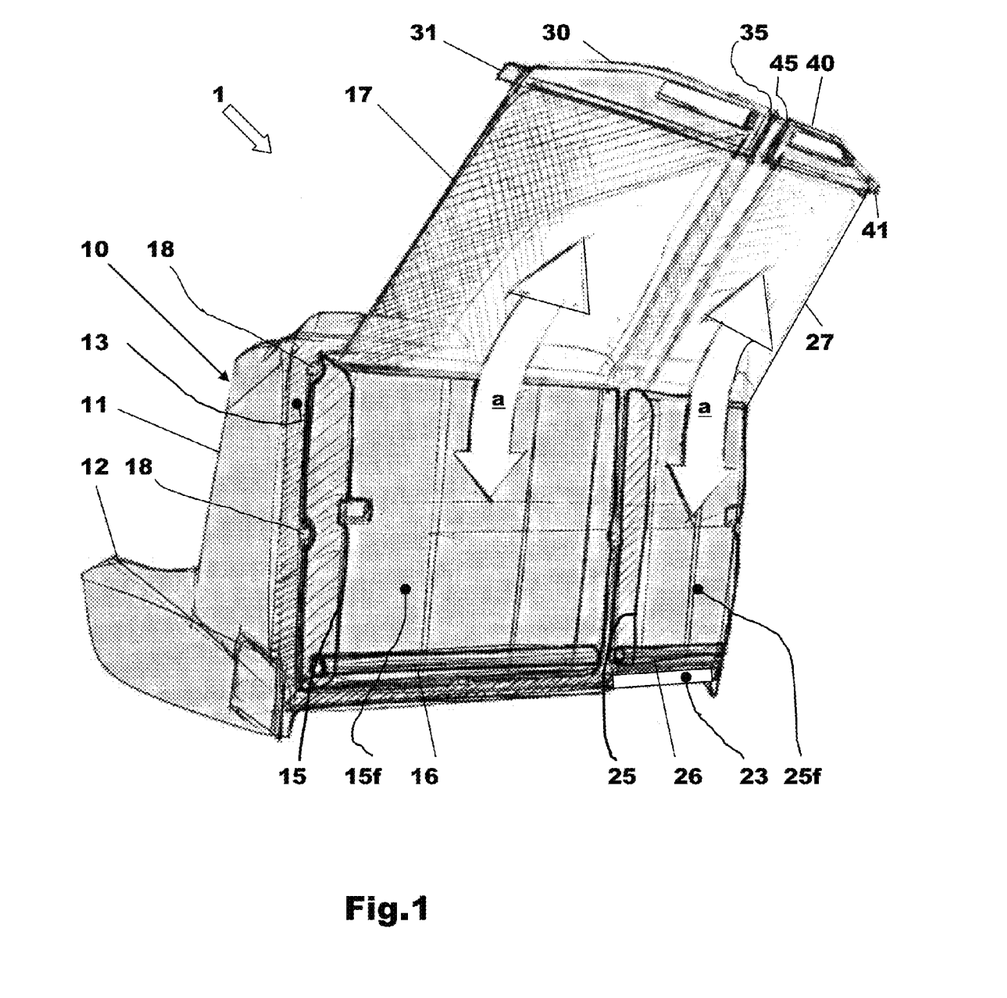
FIG. 1 is a pictorial rear view of a split folding seat according to a first embodiment of a first aspect of the invention.
Figure 2:
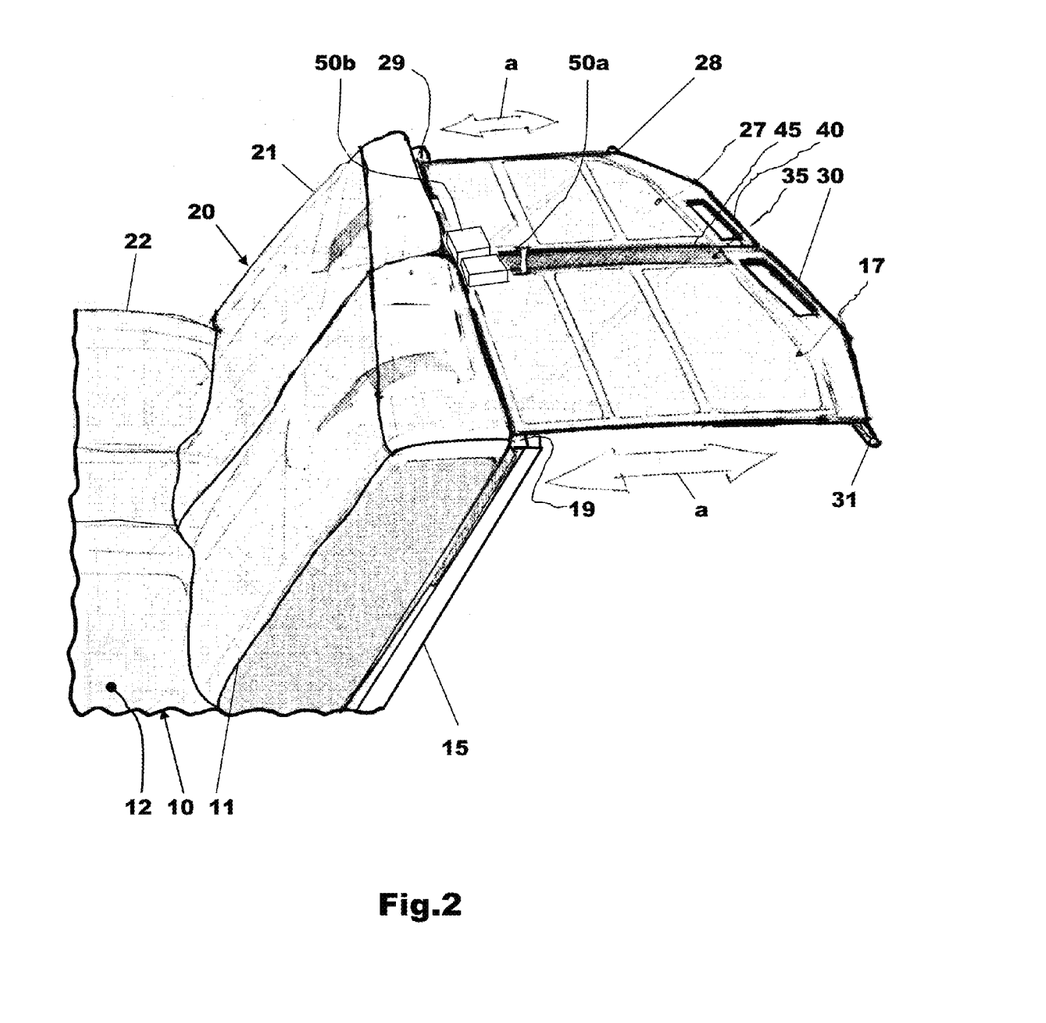
FIG. 2 is a pictorial side view of the split folding seat shown in FIG. 1 showing two flexible luggage compartment covers in an in-use position.

Referring to FIGS. 1 and 2, there is shown a first embodiment of a split folding seat assembly 1 for a motor vehicle. The split folding seat assembly 1 comprises a left-hand side first seat 10, a right-hand side second seat 20 and respective first and second flexible luggage compartment cover assemblies 15, 16, 17; 25, 26, 27.

The left-hand side first flexible luggage compartment cover assembly includes a luggage compartment cover housing 15 and a flexible luggage compartment cover comprising a first sheet of flexible material 17 and a first roller 16 upon which the sheet of flexible material 17 is rolled when the flexible luggage compartment cover is stowed and from which the sheet of flexible material 17 is unrolled when the luggage compartment cover is in use. The roller 16 is spring biased so as to roll the sheet of flexible material 17 thereon whenever possible.

The right-hand side second flexible luggage compartment cover assembly includes a luggage compartment cover housing 25 and a flexible luggage compartment cover comprising a second sheet of flexible material 27 and a second roller 26 upon which the sheet of flexible material 27 is rolled when the flexible luggage compartment cover is stowed and from which the sheet of flexible material 27 is unrolled when the luggage compartment cover is in use. The roller 26 is spring biased so as to roll the sheet of flexible material 27 thereon whenever possible.

Therefore, the left-hand side and right-hand side flexible luggage compartment covers are in the form of individual roller blinds.

The pair of independently foldable passenger seats 10, 20 each has a respective seat cushion 12, 22 and backrest 11, 21. Each backrest 11, 21 is moveable from a substantially upright position (as shown in FIGS. 1 and 2) to a stowed position in which the respective backrest 11, 21 lies substantially horizontally. In some embodiments each backrest 11, 21 may lie upon the seat cushion 12, 22 of the seat 10, 20 of which it forms a part. Suitable mechanisms to facilitate such movement are well known in the art and are not described further herein.

The left-hand side (first) backrest 11 has a rear face 13 to which a respective luggage compartment cover housing 15 is attached for stowing the sheet of flexible material 17 on the roller 16. The luggage compartment cover housing 15 extends over substantially the entire rear face 13 of the backrest 11 to which it is attached. The roller 16 is rotatably supported within the luggage compartment cover housing 15 by a pair of spaced apart supports (not shown). The supports are either directly fastened to the backrest 11, attached to the luggage compartment housing 15 or are formed as an integral part of the luggage compartment cover housing 15. In the latter two cases the supports are fastened to the backrest 11 via the luggage compartment cover housing 15 which is itself attached to the backrest 11 by securing means 18. Advantageously, the roller supports are formed as an integral part of the luggage compartment cover housing and are not separate components.

The roller 16 is rotatably mounted at a lower end of the luggage compartment cover housing 15 so that even when the sheet of flexible material 17 is fully retracted a length of flexible material 17 extends from the roller 16 to an opening 19 at an upper end of the luggage compartment cover housing 15.

The right-hand side (second) backrest 21 has a rear face 23 to which a respective luggage compartment cover housing 25 is attached for stowing the sheet of flexible material 27 on the roller 26. The luggage compartment cover housing 25 extends over substantially the entire rear face 23 of the backrest 21 to which it is attached. The roller 26 is rotatably supported within the luggage compartment cover housing 25 by a pair of spaced apart supports (not shown). As with the left-hand side backrest 11, the supports are either directly fastened to the backrest 21, attached to the luggage compartment housing 15 or are formed as an integral part of the luggage compartment cover housing 25. In the latter two cases the supports are fastened to the backrest 21 via the luggage compartment cover housing 25 which is itself attached to the backrest 21 by securing means (not shown).

The roller 26 is rotatably mounted at a lower end of the luggage compartment cover housing 25 and even when the sheet of flexible material 27 is fully retracted a length of flexible material 27 extends from the roller 26 to an opening 29 at an upper end of the luggage compartment cover housing 25.

The sheets of flexible material 17, 27 are moveable in and out of the luggage compartment cover housings 15, 25 as indicated by the arrows 'a' on FIGS. 1 and 2. When the sheets of flexible material 17, 27 are rolled upon the rollers 16, 26, a free end 30, 40 of each of the flexible sheets 17, 27 is positioned close to the respective opening 19, 29 in the luggage compartment cover housings 15, 26 and the luggage compartment cover is said to be in a stowed position.

When the sheets of flexible material 17, 27 are un-rolled from the rollers 16, 26, (as shown in FIG. 2) the free end 30, 40 of each of the flexible sheets 17, 27 is positioned close to a rear end of the luggage compartment (not shown) so as to cover the luggage compartment of the motor vehicle and obscure items stored in the luggage compartment from view. When the luggage compartment cover is in this state it is said to be in an 'in-use' position. To guide and hold the sheets of flexible material 17, 27 in their respective 'in-use' positions an outwardly extending finger 31, 41 is provided on an outer edge of each sheet of flexible material 17, 27 at the rear end 30, 40 thereof. The fingers 31, 41 are, as is well known in the art, engageable with retaining slots or grooves located on the motor vehicle at the rear end of the luggage compartment to hold the sheets of flexible material 17, 27 in the in-use position.

The first sheet of flexible material 17 is adapted along an inner edge 35 for engagement with a complementary inner edge 45 of the other second sheet of flexible material 27. When the two sheets of flexible material 17, 27 are in their in-use positions their inner edges 35, 45 are linked together so as to increase the structural integrity of the luggage compartment cover. The mechanism to achieve this linking may be of many forms that include but are not limited to a zip fastening system and a zip-lock fastening system.

For example, U.S. Pat. No. 6,220,754, which is hereby incorporated herein by reference, discloses a zip-lock fastener having male and female fastener strips and a slider. Such a mechanism could be adapted for use by providing male and female fastener strips on the inner edges 35, 45 of the two sheets of flexible material 17, 27 and a stationary joining device having parts 50a, 50b attached to the top of each luggage compartment cover housings 15, 26 with the same function as the slider for joining the two edges together. When the two sheets of flexible material 17.27 are stowed they are detached from one another and the action of drawing the two sheets of flexible material 17, 27 through the joining device 50a, 50b when moving them to their in-use position links them together.

It will be appreciated that other mechanisms for linking the two inner edges 35, 45 together can be used according to other embodiments and that the invention is not limited to the use of a zip-lock type fastener.

One advantage of this first embodiment is that the two backrests 11, 21 can be stowed without the need to remove any part of the attached luggage compartment cover assembly 15, 16, 17; 25, 26, 27. Another advantage of this embodiment is that the luggage compartment cover housings 15, 25 both have large substantially flat surfaces 15f, 25f facing the luggage compartment when the backrests 11, 21 are in their substantially upright positions. When the backrests 11, 21 are stowed these large flat surfaces 15f, 25f form an extended floor for the luggage compartment and do not interfere with the stowage of luggage in the luggage compartment.

Referring now to FIGS. 3 to 5b there is shown diagrammatically a second embodiment of a split folding seat assembly 101 for a motor vehicle which in many respects is the same as that previously described in connection with the first embodiment.

Figure 3:
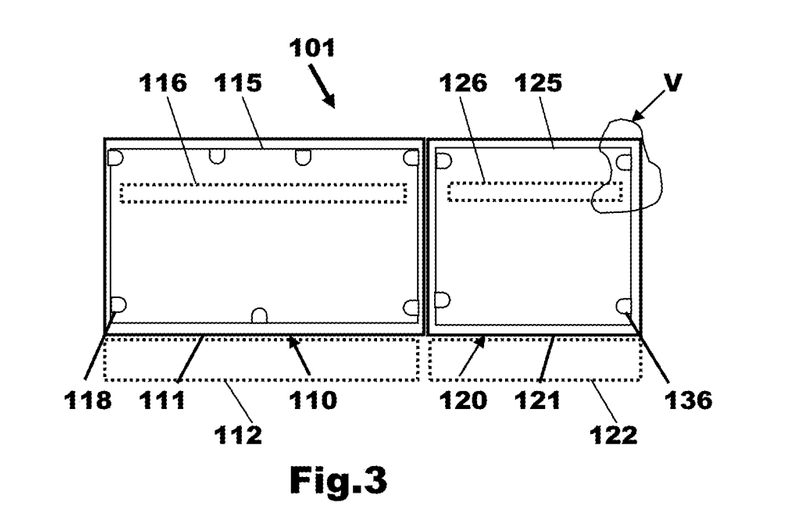
FIG. 3 is a diagrammatic rear view of a second embodiment of a split folding seat showing two backrests in substantially upright positions.

The split folding seat assembly 101 comprises a left-hand side first seat 110, a right-hand side second seat 120 and respective first and second flexible luggage compartment cover assemblies 115, 116, 117; 125, 126, 127. The left and right hand side seats 110, 120 are both individually attached to a passenger compartment floor 100 of the motor vehicle of which they form a part.

The left-hand side first flexible luggage compartment cover assembly includes a first luggage compartment cover housing 115 and a flexible luggage compartment cover comprising a first sheet of flexible material 117 and a first roller 116 upon which the sheet of flexible material 117 is rolled when the flexible luggage compartment cover is stowed and from which the sheet of flexible material 117 is unrolled when the luggage compartment cover is in use. The roller 116 is spring biased so as to roll the sheet of flexible material 117 thereon whenever possible. A number of spaced apart fixing means 118 are provided for fastening the luggage compartment cover housing 115 to a backrest 111 of the left hand seat which also includes a seat cushion 112.

The right-hand side second flexible luggage compartment cover assembly includes a second luggage compartment cover housing 125 and a flexible luggage compartment cover comprising a second sheet of flexible material 127 and a second roller 126 upon which the sheet of flexible material 127 is rolled when the flexible luggage compartment cover is stowed and from which the sheet of flexible material 127 is unrolled when the luggage compartment cover is in use. The roller 126 is spring biased so as to roll the sheet of flexible material 127 thereon whenever possible. A number of spaced apart fixing means 136 are provided for fastening the luggage compartment cover housing 125 to a backrest 121 of the right hand seat which also includes a seat cushion 122.

Therefore, the left-hand side and right-hand side flexible luggage compartment covers are in the form of individual roller blinds.

Figure 5A:
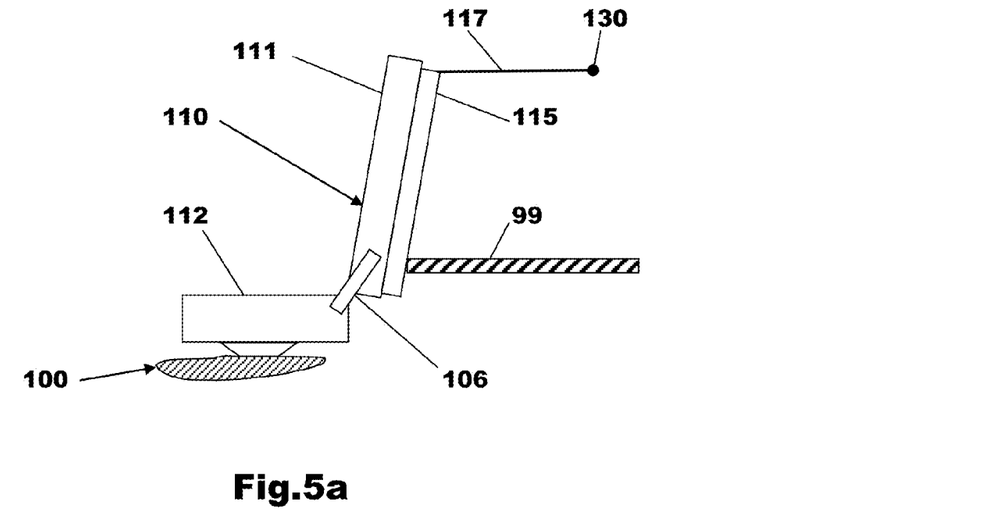
FIG. 5a is a side view of the split folding seat shown in FIG. 3 with a flexible luggage compartment cover attached to a left-hand side seat in an in-use position.
Figure 5B:
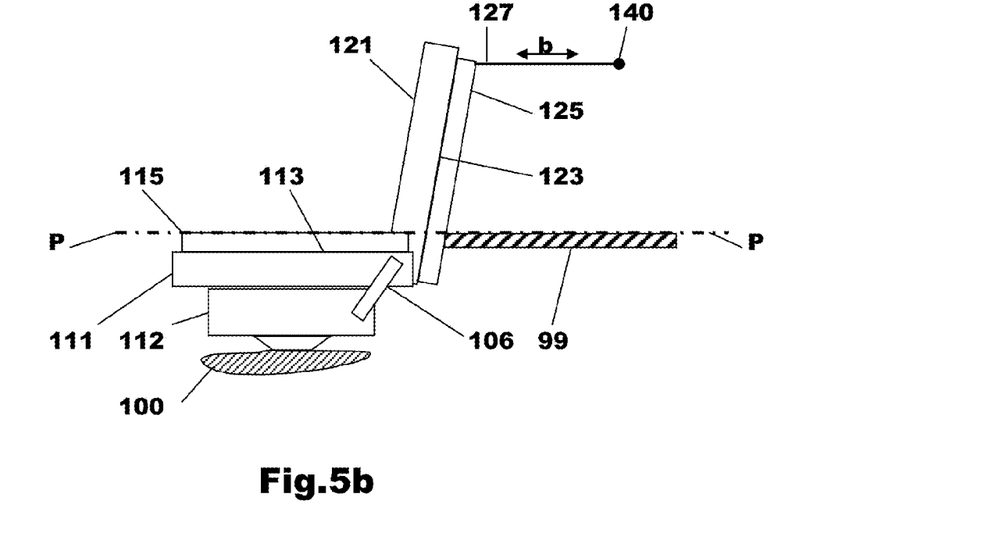
FIG. 5b is a side view similar to FIG. 5a but showing a left-hand side backrest in a folded forward stowed position and a right-hand side backrest in a substantially upright in-use position with a flexible luggage compartment cover attached to the right-hand side seat in an in-use position.

Each of the backrests 111, 121 is moveable from a substantially upright position (as shown in FIGS. 3 and 5a) to a stowed position. FIG. 5b shows the left-hand side backrest 111 in a stowed position in which it lies substantially horizontally upon the seat cushion 112 of the seat 10 of which it forms a part. The backrest 121 is similarly moveable but is shown in a substantially upright or in-use position in FIG. 5b.

Suitable mechanisms to facilitate such movement are well known in the art and one such mechanism is shown in FIGS. 5a and 5b in the form of a hinged link 106.

As shown in FIG. 5b with respect to the left hand side luggage compartment cover housing 115 each of the luggage compartment cover housings 115, 125 has a flat surface that lies substantially on a horizontal plane P-P that is common with an upper face of a rear floor or luggage compartment floor 99 when the respective backrest 111, 121 is folded forward to the stowed position. In other embodiments there may be a slight angle formed between the respective flat surfaces on the luggage compartment cover housings 115, 125 and the plane P-P if the respective backrest 111, 121 does not fold completely flat. In either case an obstruction free substantially continuous load carrying surface is formed with the luggage compartment floor 99. It should be appreciated that trim components may be provided to cover any gaps between a folded backrest 111 or 121 and the rear floor 99 when the respective backrest 111, 121 is folded forward.

The left-hand side backrest 111 has a rear face 113 to which a respective luggage compartment cover housing 115 is attached for stowing the sheet of flexible material 117 on the roller 116. The luggage compartment cover housing 115 extends over substantially the entire rear face 113 of the backrest 111 to which it is attached. The roller 116 is rotatably supported within the luggage compartment cover housing 115 by a pair of spaced apart supports (not shown). The supports are in this case formed as an integral part of the luggage compartment cover housing 115.

The roller 116 is rotatably mounted at an upper end of the luggage compartment cover housing 115 and when the sheet of flexible material 117 is fully retracted a short length of flexible material 117 extends from the roller 116 through an opening (not shown) at an upper end of the luggage compartment cover housing 115. In this case the length of flexible material 117 between the roller 116 and the opening is relatively short compared to the length in the first embodiment due to the mounting of the roller 116 at an upper end of the luggage compartment cover housing 115, thereby reducing the total length of material required to produce the sheet of flexible material 117.

The right-hand side backrest 121 has a rear face 123 to which a respective luggage compartment cover housing 125 is attached for stowing the sheet of flexible material 127 on the roller 126. The luggage compartment cover housing 125 extends over substantially the entire rear face 123 of the backrest 121 to which it is attached.

Figure 4:
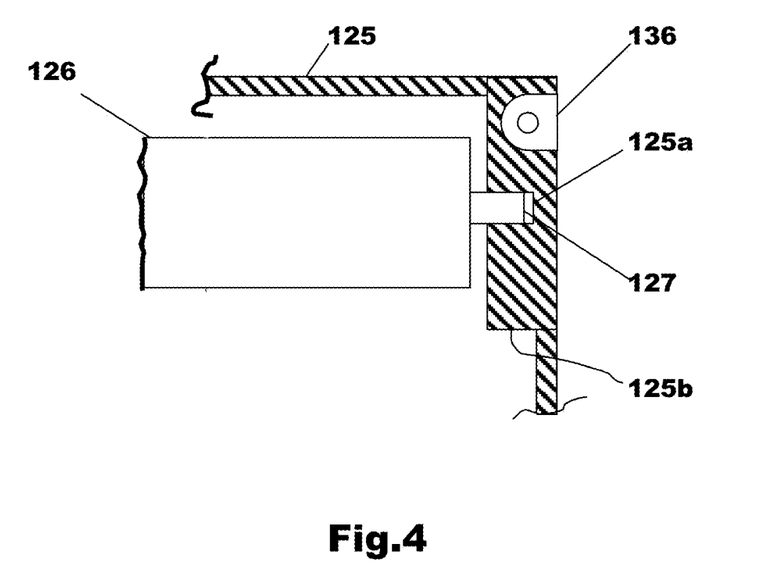
FIG. 4 is a partial cross-sectioned view in the region "V" shown in FIG. 3.

The roller 126 is rotatably supported within the luggage compartment cover housing 125 by a pair of spaced apart supports, one of which (125b) is shown in FIG. 4. The supports are formed as an integral part of the luggage compartment cover housing 125.

As shown in FIG. 4 the roller 126 has an outwardly extending shaft 127 engaged with a cylindrical recess 125a formed in the support 125b. The same arrangement is used at the opposite end of the roller 126 and for supporting the roller 116 in the luggage compartment cover housing 115. Therefore each of the rollers 116, 126 has a shaft extending out from opposite ends for engagement with complementary recesses formed in the respective luggage compartment cover housing 115, 125.

The roller 126 is rotatably mounted at an upper end of the luggage compartment cover housing 125 and when the sheet of flexible material 127 is fully retracted a short length of the sheet of flexible material 127 extends from the roller 116 through an opening (not shown) at an upper end of the luggage compartment cover housing 125. This arrangement reduces the total length of material required to produce the sheet of flexible material 127 compared to the arrangement used for the first embodiment.

The first and second sheets of flexible material 117, 127 are moveable in and out of the luggage compartment cover housings 115, 125 as indicated by the arrow 'b' on FIG. 5b. When the sheets of flexible material 117, 127 are rolled upon the rollers 116, 126, a free end 130, 140 of each of the flexible sheets 117, 127 is positioned close to the respective openings in the luggage compartment cover housings 115, 125 and the luggage compartment cover is said to be in a stowed position.

When the sheets of flexible material 117, 127 are un-rolled from the rollers 116, 126, (as shown in FIG. 5a for the flexible sheet 117 and FIG. 5b for the flexible sheet 127) the respective free end 130, 140 of each of the flexible sheets 117, 127 is positioned close to a rear end of the luggage compartment (not shown) so as to cover the luggage compartment of the motor vehicle and obscure items stored in the luggage compartment from view. When the luggage compartment cover is in this state it is said to be in an 'in-use' position.

To guide and hold the sheets of flexible material 117, 127 in their respective 'in-use' positions, an outwardly extending finger (not shown) is provided on an outer edge of each sheet of flexible material 117, 127 at the rear end 130, 140 thereof. The fingers are, as is well known in the art, engageable with retaining slots or grooves located on the motor vehicle at the rear end of the luggage compartment to hold the sheets of flexible material 117, 127 in the in-use position.

The sheet of flexible material 117 can adapted along an inner edge for engagement with a complementary inner edge of the other sheet of flexible material 127 so as to link adjacent edges of the two sheets of flexible material 117, 127 together when they are in their in-use positions.

One advantage of this embodiment is that less material is required to manufacture the flexible sheets 117, 127.

It will be appreciated that the flexible sheet could be in the form of a roller shutter having a number of slats joined together by links so as to enable it to be wound onto a roller. One example of such a roller shutter is shown and described in German Patent Application 4328886 A1.

Therefore in summary, one aspect of the invention provides a folding seat assembly having a pair of foldable backrests that can be folded down without the need to remove a luggage compartment cover from the vehicle. This is achieved by attaching a luggage compartment cover housing to each folding backrest such that the respective luggage compartment cover housing extends over substantially the entire rear surface of the backrest to which it is attached. Therefore, when the respective backrest is folded down a substantially continuous obstruction free load surface is produced in combination with a rear floor of the motor vehicle.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

What is claimed is:

1. A split folding seat assembly for mounting in a motor vehicle comprising a rear floor and a pair of independently foldable backrests, each backrest having a rear face defining a rear surface area to which a respective luggage compartment cover housing is attached for stowing a flexible luggage compartment cover, wherein each luggage compartment cover housing extends over substantially the entire rear surface area of the respective backrest to which the luggage compartment cover housing is attached to form a substantially flat surface and each luggage cover housing forms a substantially continuous flat surface with a rear floor when the respective backrest is folded forward.

2. An assembly as claimed in claim 1, wherein each flexible luggage compartment cover comprises a sheet of flexible material and a roller upon which the sheet of flexible material is rolled when the flexible luggage compartment cover is stowed and from which the sheet of flexible material is unrolled when the flexible luggage compartment cover is in use.

3. An assembly as claimed in claim 2, wherein each sheet of flexible material is adapted along one edge for locking engagement with a complementary adjacent edge of an other sheet of flexible material when the flexible luggage compartment covers are both in use.

4. An assembly as claimed in claim 2, wherein each roller is rotatably supported by a pair of spaced apart supports fastened to the backrest.

5. An assembly as claimed in claim 4, wherein the pair of spaced apart supports is fastened to the backrest via the luggage compartment cover housing.

6. An assembly as claimed in claim 5, wherein the pair of spaced apart supports are formed as an integral part of the respective luggage compartment cover housing.

7. A motor vehicle having a split folding seat assembly as claimed in claim 1.

8. A vehicle split folding seat assembly comprising:
   first and second independently foldable backrests each having a rear face defining a rear surface area;
   a first luggage compartment cover housing attached to the first backrest for stowing a first flexible luggage compartment cover, wherein the first luggage compartment cover housing extends over substantially the entire rear surface area of the first backrest to form a substantially flat surface; and
   a second luggage compartment cover housing attached to the second backrest for stowing a second flexible luggage compartment cover, wherein the second luggage compartment cover housing extends over substantially the entire rear surface area of the second backrest to form a substantially flat surface; and
   the first and second luggage cover housings form a substantially continuous flat surface with a rear floor when the respective backrest is folded forward.

9. The assembly as claimed in claim 8, wherein each of the first and second flexible luggage compartment covers comprises a sheet of flexible material and a roller upon which the sheet of flexible material is rolled when the first or second flexible luggage compartment cover is stowed and from which the sheet of flexible material is unrolled when the first or second flexible luggage compartment cover is in use.

10. The assembly as claimed in claim 9, wherein each sheet of flexible material is adapted along one edge for locking engagement with a complimentary adjacent edge of an other sheet of flexible material when the first and second flexible luggage compartment covers are both in use.

11. The assembly as claimed in claim 9, wherein each roller is rotatably supported by a pair of spaced apart supports fastened to the backrest.

12. The assembly as claimed in claim 11, wherein the pair of spaced apart supports is fastened to the backrest via the first or second luggage compartment cover housing.

13. The assembly as claimed in claim 12, wherein the pair of spaced apart supports are formed as an integral part of the respective first or second luggage compartment cover housing.

14. A motor vehicle having a split folding seat assembly comprising a pair of independently foldable backrests, each backrest having a rear face defining a rear surface area to which a respective luggage compartment cover housing is attached for stowing a flexible luggage compartment cover, wherein each luggage compartment cover housing extends over substantially the entire rear surface area of the respective backrest to which it is attached to form a substantially flat surface, and each luggage cover housing forms a substantially continuous flat surface with a rear floor when the respective backrest is folded forward.

* * * * *